United States Patent

[11] 3,563,509

| [72] | Inventor | Clyde H. Chronister |
| | | 4 Kings Row, Rte. 14, Houston, Tex. 77040 |
| [21] | Appl. No. | 839,280 |
| [22] | Filed | July 7, 1969 |
| [45] | Patented | Feb. 16, 1971 |

[54] VALVE
13 Claims, 4 Drawing Figs.

[52] U.S. Cl. ..................................................... 251/159; 137/584
[51] Int. Cl. ..................................................... F16k 1/02
[50] Field of Search ......................................... 251/369, 159; 137/245, 321, 323, 329, 611, 612, 584

[56] References Cited
UNITED STATES PATENTS

| 118,639 | 8/1871 | Phipps .......................... | 137/611 |
| 406,447 | 7/1889 | Kennedy, Jr. ................. | 137/611 |
| 821,191 | 5/1906 | Pringle ......................... | 137/323X |
| 1,157,642 | 10/1915 | Fisher ........................... | 137/329X |
| 2,481,733 | 9/1949 | Elias ............................. | 251/369X |
| 2,630,783 | 3/1953 | Reeve ............................ | 251/369X |
| 3,210,940 | 10/1965 | Bunnelle ....................... | 137/611 |

*Primary Examiner*—Samuel Scott
*Attorneys*—James F. Weiler, Jefferson D. Giller, William A. Stout, Paul L. De Verter II, Dudley R. Dobie Jr. and Henry W. Hope ABSTRACT: A pipe elbow in a valve housing, which has an inlet and an outlet, with the first end of the elbow rotatably connected to the outlet and a trunnion axially aligned with the outlet whereby the elbow may be rotated about the trunnion and first end to bring the second end into and out of alignment with the inlet. Seal means for closing off the second end when the second end is moved out of alignment with the inlet into a valve closed position. A collar slidably engaging the inlet with engaging means actuated by the elbow upon movement of the second end into alignment with the inlet for moving the collar towards and sealing with the pipe second end. Seal means for closing said valve being pivotally supported at an edge remote from the inlet and spring means connected to the edge nearest the inlet for normally retracting the seal from the second end of the pipe and means operable outside of the housing for moving the seal towards and away from the second end of the pipe.

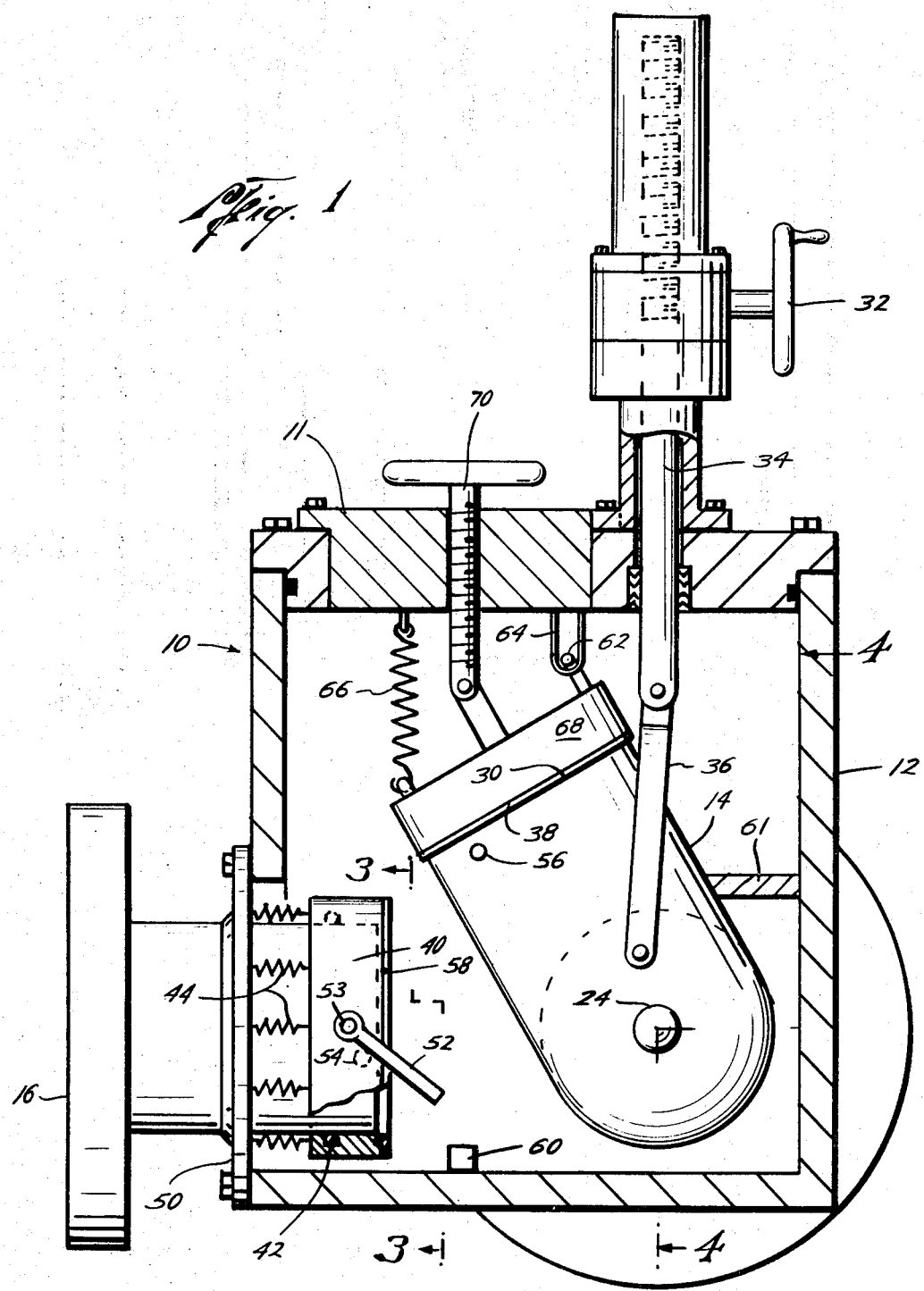

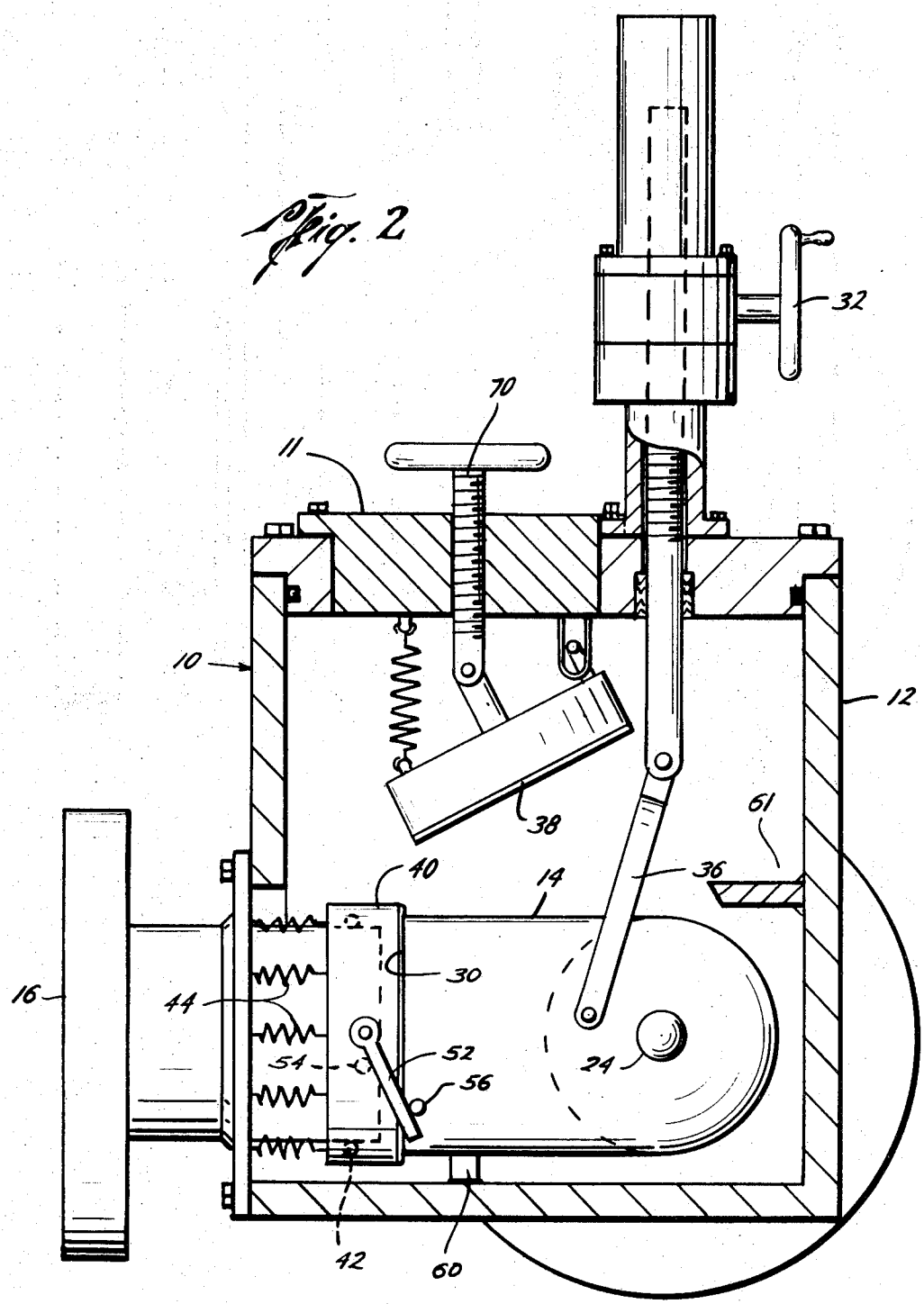

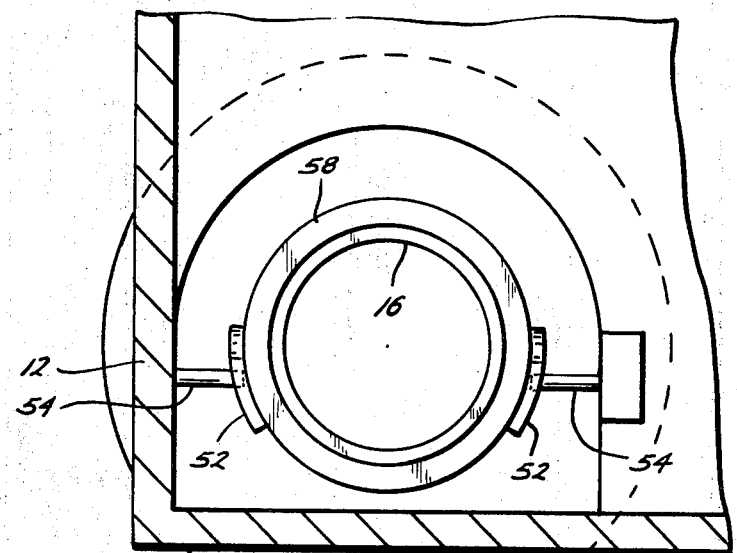
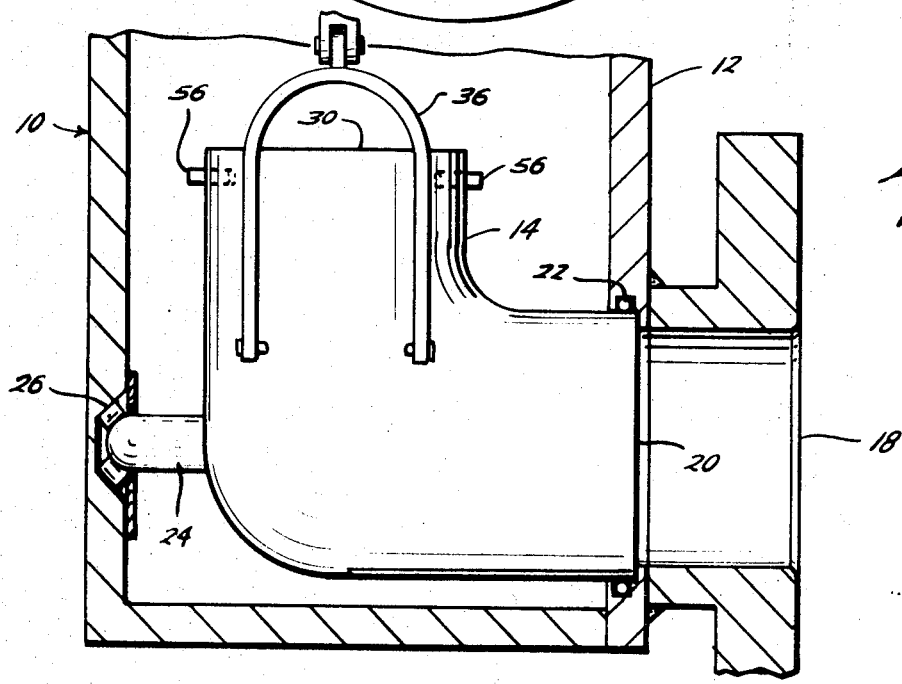

3,563,509

VALVE

BACKGROUND OF THE INVENTION

While various types of ball valves, plug valves, and gate valves are used for controlling the flow of liquids and gases, they are relatively expensive.

The present invention is directed to providing a simple and inexpensive valve, which is particularly useful for controlling the low pressure flow of liquids and gases which utilizes a pipe bend, preferably a conventional elbow, which can be rotated in a valve housing between an open and closed position and which can be inexpensively and easily manufactured. The present invention is also directed to a valve in which it is possible to work on the closing seal while the valve is in open and flowing position.

SUMMARY

The present invention is directed to providing a valve having a housing including an inlet and outlet with a pipe bend such as an elbow having a first end pivotally sealable to the housing outlet and supported on a trunnion axially aligned with the outlet whereby the bend may be rotated for aligning the second end of the pipe with the inlet in a first position for placing the valve in an open position and for moving the second end out of alignment with the inlet and into engagement with a seal in the housing in a second position for placing the valve in a closed position.

Another feature of the present invention is the provision of a collar slidable with and sealingly engaging the inlet with latching means actuated by the pipe second end upon movement into alignment with the inlet for moving the collar into sealing engagement with the pipe second end.

A still further feature of the present invention is pivotally supporting the valve closing seal means at an edge remote from the inlet and normally retracting the seal means from the path of travel of the second end of the pipe by suitable means such as a spring. Further, seal actuating means are provided extending through the housing and operable outside of the housing for moving the seal toward and away from the second end of the pipe when the second end is in position for closing the valve.

Another feature of the present invention is the provision of a valve in which the seal used for closing the valve may be repaired or changed while the valve is in the open position with full service pressure flowing through the valve.

BRIEF DESCRIPTION OF THE DRAWINGS

FIG. 1 is an elevational view, partly in cross section, illustrating the preferred embodiment of the present invention with the valve in the closed position;

FIG. 2 is a view similar to that of FIG. 1 showing the valve in the open position;

FIG. 3 is a fragmentary view taken along the line 3-3 of FIG. 1; and

FIG. 4 is a fragmentary cross-sectional view taken along the line 4-4 of FIG. 1.

DESCRIPTION OF THE PREFERRED EMBODIMENT

Referring now to the drawings, and particularly to FIGS. 1, 2 and 4, the reference numeral 10 generally indicates the valve of the present invention and includes a housing 12 and a pipe bend 14 such as an elbow.

The housing 12 includes an inlet 16 and an outlet 18 (FIG. 4). The pipe bend 14 is preferably a pipe elbow having a first end 20 (FIG. 4) which is aligned with the outlet 18 and rotatable in the housing 14 and sealed by a suitable seal means such as O rings 22 so as to be sealingly connected to the outlet 18.

Elbow 14 is further supported in the housing 14 by a trunnion 24 which is in turn supported from suitable bearings 26. The trunnion 24 is axially aligned with the axis of the outlet 18 whereby the elbow 14 may be rotated about the first end 20 and the trunnion 24 to bring the second end 30 into alignment and out of alignment with the valve inlet 16. The use of elbow 14 allows valve 10 to be used in a pipeline in place of a normal elbow, for instance in a pipe manifold, thereby saving the cost of an elbow in the line.

Any suitable means for actuating and rotating the pipe elbow 14 may be used such as a hand wheel 32 which actuates, through suitable gears (not shown), a stem 34 which is in turn pivotally connected to a saddle 36 which is pivotally connected to the elbow 14.

The elbow 14 may be rotated between a closed position, as shown in FIG. 1 wherein the end 30 may be closed and sealed by a seal 38, or an aligned position with the inlet 16, as best seen in FIG. 2, in which the valve 10 is in the open position.

In order to provide a seal when the elbow end 30 is aligned with the inlet 16, a collar 40 is longitudinally slidable with the inlet 16 and is sealed therewith such as by O ring 42. A plurality of springs 44 may be provided, one end of which is connected to a ring 50 positioned about inlet 16, and the other end is connected to the collar 40 for yieldably pulling the collar 40 towards the ring 50 and out of the path of travel of pipe end 30. In order to move the collar 40 towards the pipe end 30 and seal there against when the end 30 is aligned with the inlet 16, latching arms 52 may be provided on either side of the collar 40 and are normally held in an outwardly extending position as shown in FIG. 1 by pins 54 attached to and extending from the housing 12. Actuating pins 56 are provided on either side of the pipe end 30 where they will engage the arms 52 as the elbow is rotated and the end 30 is moved into alignment with the end 16. Movement of the pins 56 against the arms 52 will rotate arm ends 53 about pins 54, and as best seen in FIG. 2, will move the collar 40 into sealing engagement with the end 30 overcoming the tension pull of the springs 44. Preferably the collar 40 has a seal 58 which is positioned in and on the face of the collar 40 which is moved into engagement with the pipe end 30. It is noted that the housing 12 at the lower end provides a stop 60 to limit the travel of the elbow 14 thus insuring that the end 30 is in alignment with the inlet 16.

As previously indicated a seal 38 is provided to seal off the pipe end 30 for placing the valve 10 in the closed position when the elbow 14 is rotated away from the inlet 16 and into the closed position. The seal 38 is preferably pivotally supported by a pivot 62, preferably in a slide 64 attached to the housing 12 whereby the seal 38 is movable to allow the pipe end 30 to move into and out of engagement with the seal 38. Preferably, a spring 66 is provided normally retracting the seal means 38 away from the pipe end 30 and out of the path of travel of the pipe end 30. If greater control of the sealing action against end 30 is desired, seal-actuating means such as a screw 70 is provided, extending through the housing 12, for providing greater sealing action of the seal means 38 against the pipe end 30. Preferably, a seal seat 68 is provided carried by the seal means 38. Of course, actuating means 70 may be omitted if desired as the action of any liquid or gas coming through the inlet 16 will act against the back side of the seat 38 causing it to seal against the pipe end 30 to effectively close the valve.

In use, in FIG. 1, the valve 10 is shown in the closed position whereby any liquid or gas coming through the inlet 16 will fill up the interior of the housing 12, but is prevented from entering the elbow 14 and flowing out the outlet 18 by the seal 38. When it is desired to open the valve 10, the seal actuating screw 70 is turned to retract the seal 38 away from the end 30 of the elbow 14 and the hand wheel 32 actuates the valve stem 34 which moves downwardly to rotate the elbow 14 about the trunnion 24 and pipe end 30. The seal 38 moves out of the path of travel of the pipe end 30 by the tension of the spring 66 and/or screw 70 and pivot 62 can be moved upwardly in the slide 64 out of the path of travel of pipe end 30.

The collar 40 is normally held out of the path of travel of the pipe end 30 by the action of springs 44 and therefore the pipe end 30 may be moved into alignment with the inlet 16. As the elbow 14 is rotated into alignment, the pin 56 on the elbow engages the actuating lever 52 rotating the arms 52 about pins 54 to move the collar 40 into sealing engagement with the pipe end 30 to place the valve 10 in the open position. It is to be noted that when the valve 10 is in the open position, the top 11 of the valve 10 may be removed for replacement of seal seat 68 and working on the seal means 38 if desired while flow is continued through the valve in the open position.

When it is desired to close the valve 10, the hand wheel 32 and thus the valve stem 34 is actuated to rotate the elbow 14 and thus the end 30. As the end 30 moves out of alignment with the inlet 16, the actuating latch arms 52 are released allowing the collar 40 to be retracted by the springs 44 out of the path of travel of the pipe end 30. As the end continues to move, it will move into engagement with the seal 38. The elbow 14 will engage top 61 when the end 30 is in proper alignment with the seal 38. Thereafter, the seal actuating means 70 may be rotated to increase the sealing action of seal member 38 against pipe end 30.

The present invention, therefore, is well adapted to carry out the objects and attain the ends and advantages mentioned as well as others inherent therein.

I claim:

1. A valve comprising:
    a housing having an inlet and an outlet;
    a pipe bend in said housing having first and second ends, the first end thereof being pivotally sealable to the outlet;
    a trunnion connected to the exterior of the bend and axially aligned with the outlet whereby the bend may be rotated about the trunnion and first end;
    actuating means pivotally connected to the bend for rotating the bend about the trunnion and the first end for aligning the second end of the pipe bend with the inlet in one position and for moving the second end out of alignment with the inlet in a second position; and
    seal means for closing off the second end when the second end of the pipe is in the second position.

2. The apparatus of claim 1 wherein the housing includes a removable portion adjacent the closing off seal.

3. The apparatus of claim 1 including:
    a collar slidable with and sealingly engaging the inlet;
    latching means actuated by the pipe second end upon movement of the second end into alignment with the inlet for moving the collar toward the second end; and
    seal means between the collar and pipe second end.

4. The apparatus of claim 3 including spring means attached to the collar yieldably urging the collar away from the pipe second end.

5. The apparatus of claim 3 wherein the latching means includes:
    a lever arm pivotally connected to the collar and extending in a direction to be engaged by the pipe second end as it is moved into alignment with the inlet; and
    a stationary pin engaging the lever arm on a side remote from the pipe which acts as a fulcrum for allowing the lever arm to move the collar into engagement with the pipe second end.

6. The apparatus of claim 5 including, spring means attached to the collar yieldably urging the collar away from the pipe second end.

7. The apparatus of claim 13 wherein the seal means is pivotally supported at an edge remote from the inlet, and
    means normally retracting said seal means from the path of travel of the second end of the pipe.

8. The apparatus of claim 7 including means extending through and operable outside the housing for moving the seal toward and away from the second end of the pipe.

9. The apparatus of claim 8 wherein the retracting means includes spring means connected to the edge of the seal means nearest the inlet.

10. The apparatus of claim 1 wherein the seal means is pivotally supported at an edge remote from the inlet, and
    means normally retracting said seal means from the path of travel of the second end of the pipe.

11. The apparatus of claim 10 wherein the retracting means includes spring means connected to the edge of the seal means nearest the inlet.

12. The apparatus of claim 10 including, means extending through and operable outside the housing for moving the seal toward and away from the second end of the pipe.

13. The apparatus of claim 12 wherein the retracting means includes spring means connected to the edge of the seal means nearest the inlet.